(12) United States Patent
DeVincentis et al.

(10) Patent No.: US 9,757,992 B2
(45) Date of Patent: Sep. 12, 2017

(54) TIRE WITH MULTIPLE BEAD CORES AND LOCKING INSERT

(75) Inventors: Robert A. DeVincentis, Simpsonville, SC (US); Michael K. Landis, Albemarle, NC (US)

(73) Assignees: Compagnie Generale Des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 499 days.

(21) Appl. No.: 14/354,073

(22) PCT Filed: Nov. 7, 2011

(86) PCT No.: PCT/US2011/059499
§ 371 (c)(1),
(2), (4) Date: Apr. 24, 2014

(87) PCT Pub. No.: WO2013/070180
PCT Pub. Date: May 16, 2013

(65) Prior Publication Data
US 2014/0299250 A1    Oct. 9, 2014

(51) Int. Cl.
*B60C 15/05* (2006.01)
*B60C 15/00* (2006.01)
*B60C 9/06* (2006.01)

(52) U.S. Cl.
CPC .............. *B60C 15/05* (2013.01); *B60C 9/06* (2013.01); *B60C 15/0018* (2013.04); *B60C 15/0081* (2013.04); *B60C 2200/02* (2013.04)

(58) Field of Classification Search
CPC . B60C 15/0018; B60C 15/0081; B60C 15/05; B60C 15/0635; B60C 2015/0614
See application file for complete search history.

(56) References Cited

U.S. PATENT DOCUMENTS 2,820,500 A * 1/1958 Dickerson ........... B60C 15/0081
                                                    152/510
4,246,949 A    1/1981 Kawasaki et al.
(Continued)

FOREIGN PATENT DOCUMENTS

EP    0392117 A2    10/1990
GB    172784    * 12/1921
JP    04-118308    * 4/1992

OTHER PUBLICATIONS

English machine translation of JP04-118308, dated Apr. 1992.*

*Primary Examiner* — Robert Dye (57) ABSTRACT

This invention relates generally to tires having multiple carcasses that wrap around multiple bead cores on a single side of the tire, and, more specifically, to a tire that has a bead core locking insert that eliminates a pullout step for one of the carcass plies or bands during fabrication, This step includes wrapping one of the plies or bands completely around said multiple bead cores that are found on a single side of the tire. In certain embodiments, the tire is an aviation tire that has bands of multiple plies that are wrapped about multiple bead cores found on each side of the tire. The bead core locking insert is found below the multiple bead cores found on each side of the tire and is adjacent to the bands that wrap around the inside and outside head cores, thereby locking these beads and associated bands together.

10 Claims, 4 Drawing Sheets

(56) References Cited

U.S. PATENT DOCUMENTS

| | | | |
|---|---|---|---|
| 5,743,976 | A | 4/1998 | Pena et al. |
| 5,759,314 | A * | 6/1998 | Southarewsky .......... B60C 9/06 152/454 |
| 6,374,891 | B1 | 4/2002 | Allmond et al. |
| 6,408,914 | B1 | 6/2002 | Lamock et al. |
| 2002/0053387 | A1 | 5/2002 | Ikuno |
| 2003/0201050 | A1 | 10/2003 | Gillard et al. |
| 2010/0269969 | A1 | 10/2010 | Azzaretto et al. |

* cited by examiner

TIRE WITH MULTIPLE BEAD CORES AND LOCKING INSERT

BACKGROUND OF THE INVENTION

Field of the Invention

This invention relates generally to tires having multiple carcass plies that wrap around multiple bead cores on a single side of the tire, arid, more specifically, to a tire that has a bead core locking insert that eliminates a pullout step for one of the carcass plies or bands during fabrication. This step Includes wrapping one of the plies or bands completely around said multiple bead cores that are found on a single side of the tire. In certain embodiments, the tire is an aviation tire that has bands of multiple plies that are wrapped about multiple bead cores found on each side of the tire. The bead core, locking insert is found below the multiple, bead cores found on each side of the tire and is adjacent to the plies or bands, that wrap around the inside and outside bead cores, thereby locking these beads and associated plies or bands together.

Description of the Related Art

Those skilled in the art are familiar with tires having multiple beads and carcass piles that are wrapped around those multiple beads. These tires often have bias ply carcass constructions and are intended to carry very heavy loads although radial ply constructions are also known. Typical applications for such tires include mining, off road, earth moving, freight hauling, and aviation environments where the tires can be subjected to high stresses due to the high loads they must endure, whether these loads be transitory or shock loads versus steady state loads, or somewhere in. between, or combination thereof. For example, the loads experienced by aircraft tires can range from 1,200 to 78,800 pounds per tire.

Figure 1:
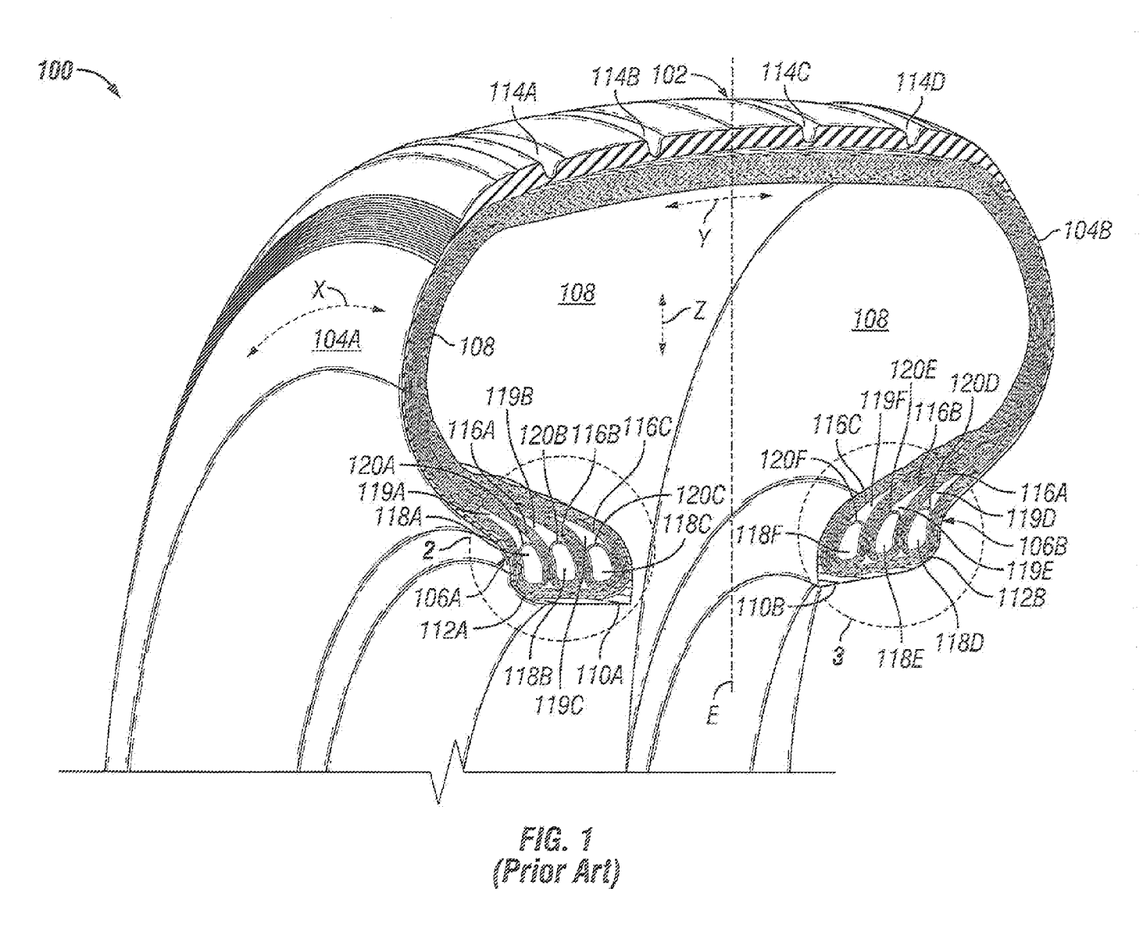
FIG. 1 is a perspective sectional view of an existing aviation tire that has multiple bead cores and multiple bands of carcass plies wrapped around the bead cores.

Looking at FIG. 1, an example of an aircraft tire 100 having multiple carcass piles wrapped around multiple beads is shown that is currently on the market and that, is a H44.5×16.5-21 sized tire. The tire 100 defines circumferential X, axial Y and radial Z directions and has a tread portion 102, sidewall portions 104A, 104B and bead areas 106A, 106B which are used to secure the tire to a wheel or rim (not shown) when the tire is inflated according to means commonly known in the art, which causes the toe portion 110 of the bead area 106, which is located toward the interior of the tire near the inner liner 108, to press down on the wheel or rim seat (not shown), thereby supporting the sidewall 104 of the tire and preventing it from rotating. At the same time, the heel portion 112 of the bead area 106, which is found toward the exterior of the tire next to the sidewall 104, helps to limit the movement of the sidewall axially along the wheel or rim seat that typically has a flange (not shown) against which the heel 112 presses. The tread 102 has circumferential grooves 114 that help the tire maintain traction in wet conditions as these grooves allow for the displacement of water, thereby decreasing the likelihood of hydroplaning. More specifically, this tire has bias ply construction for its carcass plies which are grouped in bands 116 that are each wrapped around a different bead core 118. As shown, there are three bead cores 118 on each side of tire in the respective bead areas 106 that are each wrapped by a bead, core wrap 120, which is constructed in a manner commonly known in the art. Overall, the construction of the tire is essentially symmetrical about the equatorial plane E.

Figure 2:
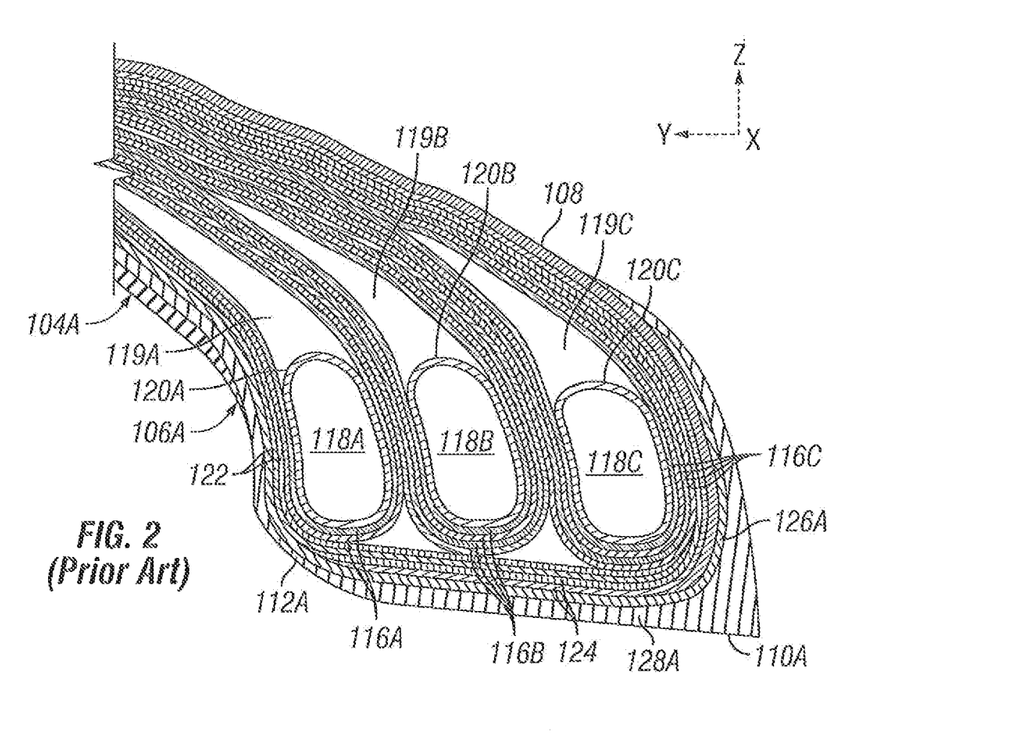
FIG. 2 is an enlarged front sectional view of the left bead area of the tire of FIG. 1.

Turning, to FIG. 2, an enlarged front view of the left bead area 106A found on the tire 100 in FIG. 1 can be seen. Again, there are three bead cores 118 and associated bead core wraps 120 that are arranged side by side in the axial Y direction of the tire. The first or leftmost bead core USA has a first set or band 116A of carcass plies that extends from the summit or tread portion 102 of the tire 100 and that are wrapped around it and its wrap 120A, bead filler 119A and associated flipper (not shown for simplicity) in a clockwise fashion. The second or middle head core 118B has a second set or band 116B of carcass piles that extends from the summit or tread portion 102 of the tire 100 and that are wrapped around it, its bead filler 119B, its wrap 120B, and associated flipper (hot shown for simplicity) in a clockwise fashion while the third or rightmost bead core 118C also has a third set or band 116C of carcass plies that extends from the summit or tread portion 102 of the tire 100 and that are wrapped around it, its bead filler 119C, its wrap 120C, and associated flipper (not shown for simplicity) in a clockwise fashion. These same bands 116 extend from this bead 106A area through the summit or tread portion 102 of the tire 100 to another set of bead cores 118 found in the rightmost head area 106B and are wrapped around them in a counterclockwise fashion (best seen in FIGS. 1 and 3).

In this tire, the first, band 116A comprises two individual carcass layers or plies while the second band 116B and third band 116C each comprise four individual carcass layers or plies. The cords of the plies are made from nylon and are embedded in an elastomeric mix and are angled from 40 to 72 degrees from the circumferential X direction or equatorial plane E of the tire 100, with the angle going from positive to negative from one ply to the other ply, Other configurations and materials are also used. For example, the cords can be made from nylon, rayon, cotton or any other suitable material It should be noted that there are examples of such tires where the wrapping of the bands of plies are in the opposite direction just described and/or where more than one band is wrapped around the same bead core. Also, as is the ease here, there may be a fourth band 122 that extends from the summit or tread portion, along the outside or exterior portion of the sidewall 104A nearest the exterior of the tire and continues underneath all the cores 118A, 118B, 118C and bands 116 that have been wrapped around them. This is called the turn down band 122 and in this ease it comprises two separate carcass layers with cords made from nylon that are embedded in an elastomeric mix and are angled from 40 to 72 degrees from the circumferential direction X or equatorial plane E of the tire in like fashion to the other plies that have been already described. Other configurations and materials are known, Finally, a fifth band 124 is utilized that extends from the summit or tread portion, along, the interior portion of the sidewall 104A of the tire adjacent the inner liner 108 and extends underneath all four of the previous bands 116, 122 and underneath all the bead cores 118A, 118B, 118C. The Fifth and fourth bands 124, 122 overlap over the entire distance in the axial Y direction found beneath the cores 118A, 118B, 119C so that once the tire is cured and the plies have all cured together and adhered to each other, these cores are effectively locked to together, allowing the plies to perform their function and create an effective spine for the tire to transmit the heavy loads exerted on it from the summit of the tire through the carcass piles to the bead cores and from there to the wheel or rim as is necessary. For this tire, the fifth band 124 comprises two separate carcass layers with cords made from nylon that are embedded in an elastomeric mix and are angled from 40 to 72 degrees from the circumferential X direction or equatorial plane E of the tire in like mariner as described above for the other plies. Other configurations and materials are known.

Beneath and to the sides of the fourth and fifth bands 122, 124, one can see first and second chafer strips 126A, 128A (sometimes referred to as finishing strips) that are found in the bead area 106 that partially surround the multi-bead assembly and therefor separate the bands found within this assembly from the wheel or vim during use and are intended to protect the same from damage that can happen should movement occur between the bead portions and the wheel. These components are routinely found in tires of all sorts including those using only a single bead core per bead area. In addition, these strips may have butyl or some other chemical property similar to the inner liner In them that helps to retain air so that the tire is less prone to deflation over time. The chafer strips are typically square woven, monofilament, calendered fabric and are not intended to provide any structural benefit to the tire. As a result, they do not lock the bead cores together. Although there can be a single chafer strip, most tires including tins one have two chaffer strips in each bead area found on each side of the tire as shown by FIGS. 2 and 3.

Figure 3:
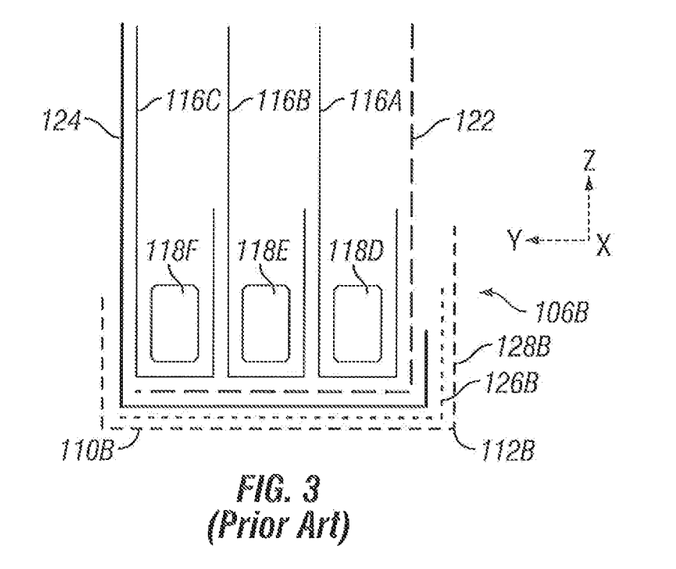
FIG. 3 is a schematic of the components found in the right bead area of FIG. 1 for enhanced clarity.

Focusing, now on FIG. 3, a schematic view of the construction of the right bead area 106B of FIG. 1 is shown for enhanced clarity. The fourth or rightmost bead core 118D has the first set or band 116A of carcass plies that extends from the summit or tread portion of the tire and that are wrapped around it in a counterclockwise fashion. The fifth or middle bead core USE has the second set or band 116B of carcass plies that extends from the summit or tread portion of the tire and that are wrapped around it in a counterclockwise fashion while the sixth or leftmost bead core USE also has a third set or band 116C of carcass plies that extends from the summit or tread portion of the tire and that are wrapped around it In a counterclockwise fashion. Note other components such as bead fillers and flippers are also present but not shown for simplicity.

Put into other words, the bead cores have carcass plies, which extend from one bead portion to the other bead portion through the sidewalls and summit or tread portion of the tire, wrapped around each of them in the following manner in both bead portions. The carcasses plies approach the bead core from the interior side of the tire, which is the side of the tire that is nearest the inner liner, and extend generally radially Z downward. They then continue underneath the bead cores in the axial Y direction and exit along the exterior surface of the bead cores, so called since this surface faces toward the exterior of the tire. From there, they extend in a general upward radial Z direction. This is typically done symmetrically about the equatorial plane E of the tire so the wrapping is consistent on both sides of the tire. However, there are examples where the wrapping is done in the opposite direction or in both directions.

The fourth band or turn down band 122 extends from the summit or tread portion, along the outside portion of the side wail that is nearest, the exterior of the tire and continues underneath all the cores 118D, 118E, 118F and bands 116 that have been wrapped around them. The fifth band 124 extends from the summit along the interior portion of the sidewall of the tire adjacent the inner liner and extends underneath all four of the previous bands 116 and underneath all the bead cores 118D, 118E, 118F in this bead area 106B. The fifth and fourth bands 122, 124 overlap over the entire distance in the axial Y direction found beneath the cores so that once the tire is cured and the bands have all cured together and adhered to each other, these cores 118D, 118E, 118F are effectively locked to together as previously described. Beneath and to the sides of the fourth and fifth bands, one can see third and fourth chafer strips 126B, 128B that are found In the bead area that partially surround the multi-bead assembly and therefor separate the bands found within this assembly from the wheel or rim during use as described above for the first bead area.

As is often the case with tires, the fourth though six bead cores 118D, 118E, 118F and third and fourth chaffer strips 126B, 128B found in the second bead area 106B have the same material properties and construction and are configured symmetrically about the equatorial plane E as compared to their counterparts found in the first bead area 106A. Specifically, the first bead core 118A matches up with the fourth bead core 118D, the second bead core 118B matches up with the fifth bead core 118E, the third bead core 118C matches up with the sixth bead core 118F, the first chaffer strip 126A matches up with the third chaffer strip 126B and the second chaffer strip 128A matches up with the fourth chaffer strip 128B, etc. The places where these tire components terminate are also in approximately the equivalent place from one side of the tire to the other, maintaining the symmetry of the tire about the equatorial plane E. The terminations for the plies that wrap around the bead cores is usually a suitable distance above the topmost extent of the bead filler, allowing the turned up portion of one of the plies to adhere to its main portion found on the other side of the bead core and bead filler. In some cases, asymmetrical designs are employed.

However, in order to show manufacturing and/or design variability, it should be noted that the schematic of FIG. 3 shows the pullout band 124 extending up radially Z past the third bead core 118D while it does not do this in FIG. 1, This can represent a design choice or manufacturing tolerances as plies often move during the manufacturing process, which is described in more detail below, such that the position a ply is originally laid may not be its final position. For example, a ply may be originally laid with the upward extension past the third bead core shown in FIG. 3 but may move during the molding and/or laying down steps of the manufacturing process, resulting in the position shown in FIG. 2 where this extension that terminates radially upward past the third bead core does not exist.

The methods of manufacturing tires with multiple bead cores are well known in the art and these processes and the equipment used in these processes are described by U.S. Pat. Nos. 4,445,962; 2,926,721 and 2,951,526, During the manufacturing process of these tires, a liner is first wrapped about the building drum then successive separate plies are then wrapped about the drum, the bead core is then positioned appropriately on the drum, finally a turn up of the plies about the bead core is then effected. Additional plies are wrapped about the drum and a second bead core is placed against the first set of plies and first bead core, after which a turn up of the additional plies is accomplished. This process can be repeated as necessary depending on how many sets of bead cores and associated wrapped plies are desired. Then the sidewalls shoulder rubber, finishing strips and tread can be added.

Once the green tire has been created, the tire drum is collapsed and the green tire is then placed into a molding apparatus that changes the configuration of the green tire front a flat cylindrical band to a toroidal shape. It is in this vulcanizing process that the beads cores, plies and rubber material physically are moved in configuration to the toroidal form such as shown by FIG. 1. Also, it is at this point that the various bands of carcass layers or plies adhere to each other, locking the bead cores together thereby creating a reinforced structure able to carry heavier loads than tires that have only a single bead core in each bead area on each side of the tire.

During the manufacturing process of the tire already described, the first band laid down sequentially on the building drum is the structural fifth band 124 mentioned above that eventually is used to help lock all the bead cores together. Initially, the outer portions of this band are wrapped underneath the building drum so that the other bead cores and plies can be applied on top of it without having the extra length at either end of this band interfering with the laying of the other components. It is therefore necessary later to manually pullout this band on the tire building drum once all the bead cores and associated piles have been laid and turned up so that it can be wrapped around ail of the bead cores and satisfy its locking function.

Figure 4:
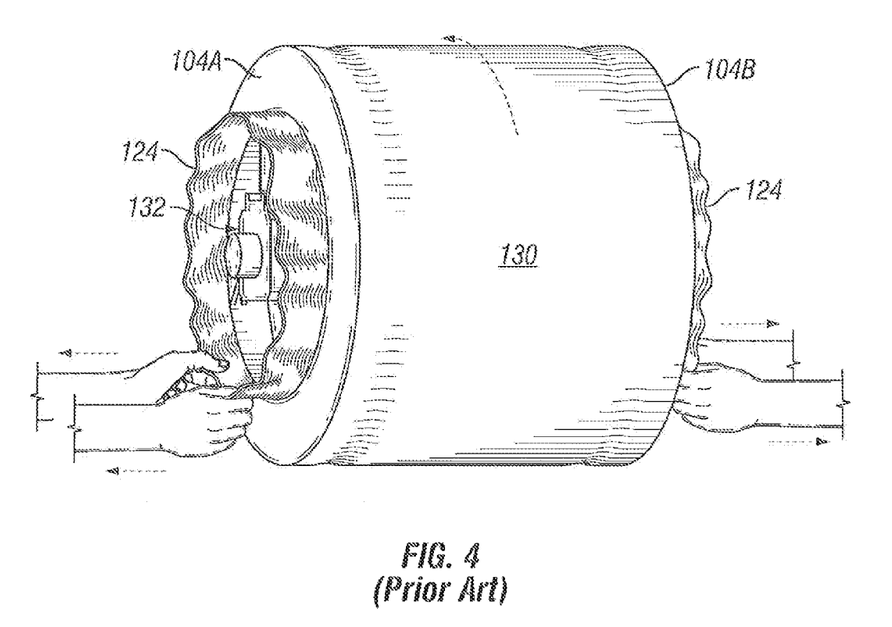
FIG. 4 depicts the manual pullout of the innermost band of carcass plies during the manufacture of the tire of FIG. 1.

FIG. 4 illustrates this pullout and wrap around step necessary during this manufacturing process. As can be imagined due to the sticky nature of the carcass plies, such a manual pullout requires an extreme amount of physical effort and repetitive motion as this step is performed repeatedly around the circumference of the building drum 132 which is periodically indexed so this fifth band 124 can be positioned correctly about the entire circumference of the green tire intermediate 130. The operators are required to bend over to reach within the building drum while doing this, which can cause them to have poor posture and the amount of pinch force necessary to accomplish this can be as high as 80 lbs of pinch force. Hence, this tire design and associated building process pose ergonomic challenges during the tire building process as well as inefficiency that increase the time necessary to make such a tire, which raises the cost of the tire.

For many aircraft tire applications, a pullout ply and a turn down ply are required in order to lock the multiple bead cores and associated wrapped around plies together. Both are required for some tires that are subjected to very high loads, such as when an aircraft is taking off or landing for instance, that a tire not having the turn down band will fail. As a result, this construction has been considered necessary for many commercial and military aircraft applications while the problems it presents have not been solved for several decades. In less demanding applications, the pull out band has not been necessary.

When developing a tire for some of these demanding aviation applications, it is typical to use a double overload test to determine if a tire can withstand approximately twice its rated load should one tire of a pair of tires located on the landing gear fail. That is to say, the surviving tire must carry the load safely until the plane can stop. Many tires intended for these harsh conditions must pass this test. This test, can be performed using equipment known in the art. For commercial aircraft manufacturers who required such testing, this can involve a single test -cycle where the tire is subjected to a rationalized Load Speed Time curve at 1.87 times the rated load. To date, no design variations that lack the pullout of the innermost ply and that have been subjected to this test and have passed, Accordingly, it is desirable to find a construction for a tire that has multiple bead cores and multiple carcass plies wrapped around the multiple bead cores that also has a way to lock said beads together in a cost efficient manner that does not require manual manipulation of a carcass ply and in a sufficiently durable manner so that it can support the heavy loads that the tire is required to handle in the field. For tires in the aviation sector, it is desirable if the new construction can pass the dynamometer double overload test reliably and consistently when required.

SUMMARY OF THE INVENTION

A tire according to a first embodiment of the present invention defines circumferential, axial and radial directions and has bead portions that have one or more (multiple) bead cores. The tire further comprises one or more carcass plies wherein the first bead core has a carcass ply wrapped around it and the second bead core has a second carcass ply wrapped around it. The tire also has a bead, core locking insert that is separate from any carcass ply and that is located adjacent said bead cores and any carcass ply that is wrapped around said bead cores.

In some embodiments, the ply that is wrapped around a bead core is a bias ply. In other cases, the carcass ply that is wrapped around the first bead core is a first carcass ply and the carcass ply that is wrapped around the second bead core is a second carcass ply that is separate from the first carcass ply.

In still other embodiments, the tire further comprises an outermost carcass ply that does not wrap-around a bead core and that extends from the sidewall next to the bead core that is located nearest the exterior of the tire and extends axially underneath one or more of the bead cores. The outermost ply then terminates near one or more of the bead cores and the bead core locking insert is found radially below and adjacent to the innermost bead core and the termination of the outermost ply. In some cases, the outermost carcass ply terminates adjacent the bead core that is located nearest the interior of the tire. In such a case, the tire may further comprise an innermost carcass ply that does not wrap around a bead core and that also terminates in the bead portion proximate the termination of the outermost carcass ply. The bead core locking insert is found adjacent said terminations of the innermost and outermost carcass plies in such a case. In fact, the bead core locking insert may extend underneath all the bead cores in the axial direction and may further extend radially upward along the interior side of the innermost carcass ply creating a splice therewith, and radially along the exterior side of the outermost carcass ply.

In some embodiments, the tire further comprises an inner liner that is relatively air impermeable and that is interposed between the bead core locking insert and the innermost carcass ply.

In other designs, the carcass plies have cores that are angled at +/−40 to 72 degrees from the circumferential direction. In still other cases, the bead core locking insert also has at least one bias ply layer with cords that are arranged at +/−40 to 72 degrees from the circumferential direction.

In some applications, the tire is an aircraft tire. Often, there is a plurality of carcass plies that are wrapped around the first bead core and another plurality of carcass plies that are wrapped around the second bead core.

Oftentimes, a tire according to an embodiment of the present invention is symmetrically configured about its equatorial plane. A ply that wraps around a bead core found in a bead portion will extend radially downward along the Interior side of the bead core, continue axially underneath the bead core, and then will return upward along the exterior side of the bead core The foregoing and other objects, features and advantages of the invention will be apparent from the following more detailed descriptions of particular embodiments of the invention, as illustrated in the accompanying drawing wherein like reference numbers represent like parts of the invention. As used herein, reference numbers in the 100's refer to a tire known already in the art and reference numbers in the 200's refer to a tire having features according to an embodiment of the present invention,

DETAILED DESCRIPTION OF THE DRAWINGS

DEFINITIONS

The longitudinal or circumferential direction, X, is tire direction of the tire along which it rolls or rotates and that is perpendicular to the axis of rotation of the tire.

The axial direction, Y, is the direction of the tire along the width-of its tread that is substantially parallel to the axis of rotation of the tire.

The radial direction, Z, is the direction of a tire as viewed from its side that is parallel to the radial direction of the generally annular shape of the tire and is perpendicular to the lateral direction thereof.

The equatorial plane, E, is a plane that cuts the tire in half and is perpendicular to the axis of rotation or is parallel to the radial direction of the tire.

DETAILED DESCRIPTION OF PARTICULAR EMBODIMENTS

Embodiments of the present invention include the use of a bead core locking insert that is found underneath the bead cores found in the bead portion of a tire and near the carcass plies that wrap around the multiple bead cores. Often, there will be at least two or sometimes four other carcass plies or band(s) of carcass layers or plies that extends from either the interior portion and/or exterior portion of the sidewall and that extend underneath and/or adjacent one or more of the multiple bead cores without wrapping around the individual bead cores. In such a case, the bead core locking insert will be found underneath, overlapping and/or adjacent to any additional carcass ply that does not wrap around an individual bead core.

Figure 5:
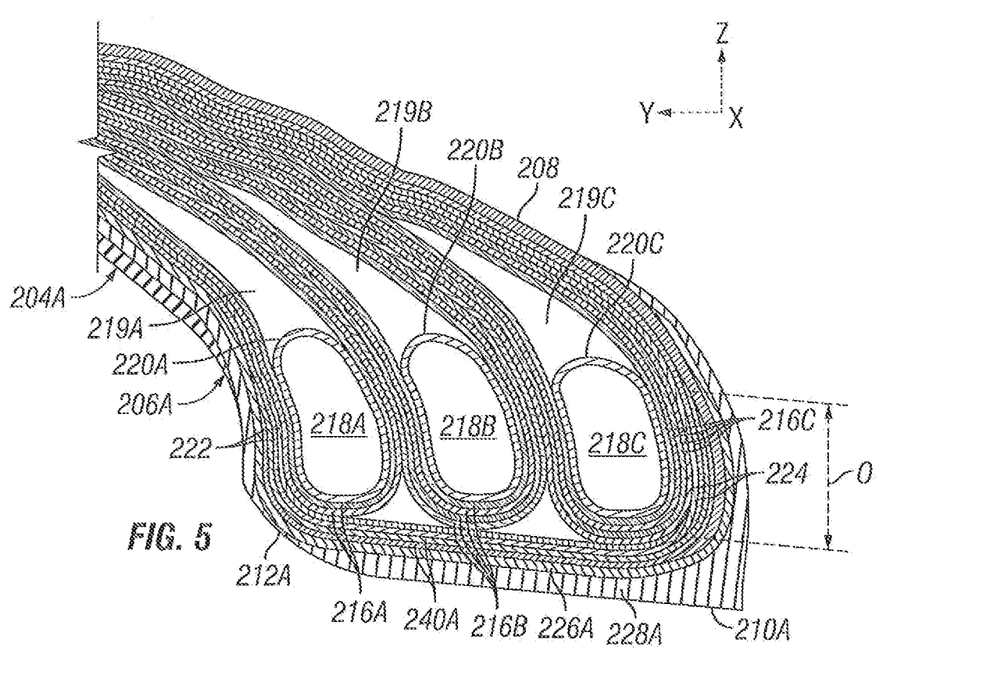
FIG. 5. is an enlarged front sectional view of the left bead area of a tire constructed with a bead locking insert according to one embodiment of the present invention.

Focusing on FIG. 5, it shows a front sectional view of a portion of a tire similar to that shown in FIG. 1 but that uses a bead core locking insert according to a first embodiment of the present invention. This tire would have similar functions and components as described above for the tire shown in FIG. 1 including having multiple carcass plies wrapped around multiple bead cores that have associated bead core wraps. This is also an H44.5×16.5-21 sized tire but this size can be changed depending on the application. The tire defines circumferential X, axial Y and radial Z directions and has a tread portion (not shown), sidewall portions 204A, 204B and left and right bead areas 206A, 206B which are used to secure the tire to a wheel or rim (not shown) when the tire is inflated according to means commonly known in the art, which causes the toe portion 210 of the bead area 206, which is located toward the interior of the tire near the inner liner 208, to press down on the wheel or rim seat (not shown), thereby preventing the tire from rotating. At the same time, the heel portion 212 of the bead area 206, which is found toward the exterior of the tire next to the sidewall 204, limits the movement of the tire axially along the wheel or rim seat that typically has a flange (not shown) against winch the heel presses.

The tread has circumferential grooves (not shown) that help the tire maintain traction in wet conditions as these grooves allow for the displacement of water, thereby decreasing the likelihood of hydroplaning. Focusing on the carcasses, this tire has bias ply construction for its carcass plies, which are grouped in bands that are each wrapped around a different bead core. There are three bead cores on each side of tire in the respective bead areas, Overall, the construction of the tire is essentially symmetrical about the equatorial plane (not shown).

The first or leftmost bead core 218A has a first set or band 216A of carcass plies that extends from the summit or tread portion of the tire and that are wrapped around it, its bead filler 219A, its associated wrap 220A, and flipper (not shown for simplicity) in a clockwise fashion. The second or middle bead core 218B has a second set or band 216B of carcass plies that extends from the summit or tread portion of the tire and that are wrapped around it, its associated wrap 220B, bead filler 219B, and flipper (not shown for simplicity) in a clockwise fashion while the third or rightmost head core 218C also has a third set or band 216C of carcass plies that extends from the summit or tread portion of the tire and that are wrapped around if, its associated wrap 220C, bead filler 219C, and flipper (not shown for Simplicity) in a clockwise fashion. These same bands extend from this bead area 206A through the summit or tread portion of the tire to another set of bead cores found in the rightmost bead area 206B and are wrapped around them in a counterclockwise fashion.

In this tire, the first band comprises two individual carcass layers while the second band and third band each comprise four individual carcass layers. The cords of the plies are made from nylon and are embedded in an elastomeric mix and are angled from 40 to 72 degrees from the circumferential direction or equatorial plane of the tire. Other configurations and materials could be used. For example, the cords can be made from nylon, rayon, cotton or any other suitable material and the angles could be varied. Also, the number of plies can be altered depending on the application. It is also, contemplated that other embodiments of the present invention include tires where the wrapping of the bands of carcasses are in the opposite direction just described and/or where more than one band or carcass ply is wrapped around the same bead core.

Additionally, there is a fourth band or turn down band 222 that extends from the outside portion of the sidewall 204 nearest the exterior of the tire and continues underneath all the bead cores and bands that have been wrapped around them in the first bead area 206A and terminates before extending radially Z upward. The turn down band in this embodiment comprises two separate carcass layers or plies with cords made from nylon that are embedded in an elastomeric mix and are angled from 40 to 72 degrees from the circumferential direction or equatorial plane of the tire.

Other configurations and materials could be used as just described for the first through third bands of carcass plies.

Finally, a fifth band 224 is found that extends from the interior portion of the sidewall 204A of the tire adjacent the inner liner 208 and that terminates near the third bead core 218C short of going underneath this bead core. This termination substantially coincides with the termination of the turn down band 222 just described. This is different than the previous construction shown by FIG. 2 where this band 224 was pulled out during the manufacturing process so that it extended underneath all the bead cores. Hence, there is no overlap between the fifth and fourth bands 222, 224 as was previously done in order to lock the bead cores together. For this embodiment, the fifth band 224 comprises two separate carcass layers or piles with cords made from nylon that are embedded in an elastomeric mix and are angled 40 to 72 degrees from the circumferential direction or equatorial plane of the tire. Other configurations and materials as described above could also be employed.

Instead of pulling out the fifth band 224 of carcass plies, a bead core locking insert 240A is provided that is located underneath these bead cores and that overlaps the fourth band or turn down band 222 and overlaps with this band over the entire distance in the axial Y direction found beneath these cores. The bead core locking insert 240A also extends past the fifth band 224 or the band that would have been pulled out band in the prior art so that there is a splice or overlap O in this region, which is toward the interior of the tire, and serves to lock the fourth and fifth bands together, which in turn lock the bead cores together as will be described in further detail later. It should be noted that the place where the fourth and fifth bands terminate can be adjusted so that the bead core locking insert does not have to extend past the heel and toe areas of the bead portion.

This splice O is present in the bead portion of the tire around the entire circumference of the tire and for this embodiment is 20 mm long but may be varied depending on design and manufacturing considerations mentioned previously and in some cases this splice may not be necessary at all in either the green tire intermediate or cured tire, or may be arranged such that the inner liner is present in the splice between the bead core locking insert and the fifth hand. The bead core locking insert 240 for this embodiment comprises two layers of bias ply tissue. The cords in these plies are arranged at an angle ranging from 40° to 72° with respect to the circumferential X direction of the tire. The first layer of the bead core locking insert that is adjacent the fifth or pullout band has the same angle orientation as the cords found in fifth band. The second layer of the bead core locking insert has the same angle value but an opposite angle orientation compared to the first layer. However, these angles of the cords of either tissue may be varied depending cm design and manufacturing considerations. Lastly, chafer strips 226A, 228A are provided wish like constructions and materials as described above for the finishing strips used for the existing tire 100 shown by FIG. 1.

Once the tire is cured and the bead core locking insert and the bands have adhered to each other, these bead cores are effectively locked to together, allowing the carcass plies to perform their function and create an effective spine for the tire to transmit the heavy loads exerted on it from the summit of the tire through the carcass plies to the bead cores and from there to the wheel or rim as is necessary. This has been substantiated by test data which will be revealed below. This can now be successfully accomplished without the use of a pullout step during the manufacturing of the tire as the bead core, locking insert can be applied after the bead cores and associated wrapped plies have already been created on the building drum and the fifth band is no longer too long, creating an obstacle during the beginning phase of the fabrication of the tire as was the ease previously. Consequently, the use of the bead core locking Insert has succeeded where previous attempts to eliminate the pullout step have failed.

Figure 6:
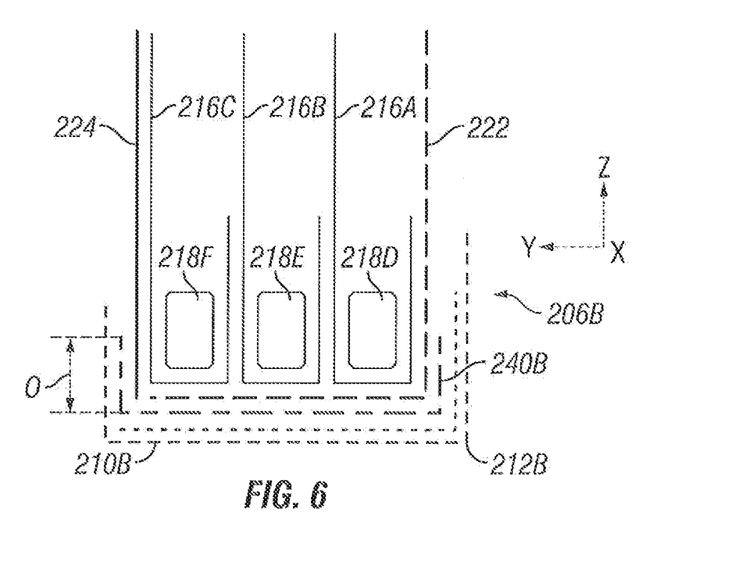
FIG. 6 shows the components in schematic format for enhanced clarity found in the right bead area of a tire having the left bead portion shown in FIG. 5 assuming that the tire is constructed in a symmetrical manner about its equatorial plane.

Finally, FIG. 6 shows a schematic view of the construction of the right bead area 206B assuming that the tire having the left bead area 206A shown in FIG. 5 is substantially symmetrically configured about its equatorial plane. The fourth or rightmost head core 218B has the first set, or band 216A of carcass plies that extends from the summit or tread portion of the tire and that are wrapped around it in a counterclockwise fashion. The fifth or middle bead core 218E has the second set or band 216B of carcass plies that extends from the summit or tread portion of the tire and that are wrapped around it in a counterclockwise fashion while the sixth or leftmost bead core 218F also has the third set or band 216C of carcass plies that extends from the summit or tread portion of the tire and that are wrapped around IT in a counterclockwise fashion. Other components such as bead fillers and flippers are omitted from this figure for enhanced clarity, The fourth band or turn down band 222 extends from the summit or tread portion, along the outside portion of the sidewall that is nearest the exterior of the tire and continues underneath all the cores and bands that have been wrapped around them. Finally, a fifth band 224 is found that extends from the summit or tread portion, along the interior portion of the sidewall of the tire adjacent the inner liner and that terminates near the sixth bead core 218F short of going underneath this bead core. This too is different than the previous construction shown by FIG. 2 where this band was pulled out during the manufacturing process so that it extended underneath all the bead cores. Hence, there is no overlap between the fifth and fourth bands as was previously done in order to lock the bead cores together. For this embodiment, the fifth band comprises two separate carcass layers with cords made from nylon that are embedded In an elastomeric mix and are angled from 40 to 72 degrees from the circumferential direction or equatorial plane of the tire. Other configurations and materials as described above could also be employed.

A second bead core locking insert 240B is provided that is located underneath the bead cores and that overlaps tire fourth band or pulldown band and overlaps with this band over the entire distance in the axial direction found beneath the cores. The bead locking insert also extends past the fifth band or the band that would have been pulled out in the prior art so that there is a splice or overlap O in this region, which is toward the interior of the tire, and serves to lock the fourth and fifth bands together, which in turn lock the bead cores together. This splice is present in the second bead portion of the tire around the entire circumference of the tire. The second bead core locking insert is constructed in like manner as described above for the first bead core locking insert. Lastly, third and fourth chafer strips 226B, 228B are provided with like constructions and materials as described above for the chafer strips used in the left bead portion 206A of the tire. Also, the bead cores found in the right bead area 206B are similarly constructed and placed in mirrored configuration about the equatorial plane of the tire to those found in the left bead area 206A in like manner as was described above for the tire shown in FIG. 1. The places where these tire components terminate are also in approximately the equivalent place from one side of the tire to the other, maintaining the symmetry of the tire about the equatorial plane. Although, it is contemplated that asymmetrical designs could he employed in other embodiments of the present invention.

other standard tire components such as bead flippers, bead core wraps, etc. may be adjusted depending on the tire application and still be used with the present invention.

Testing of several embodiments of the present invention using the double overload test has yielded the following results as shown in Table 1.

TABLE 1

Test Results for Various Designs

| Design | Test Procedure | Results |
| --- | --- | --- |
| Inner Liner placed between Bead Locking insert and Fifth Band | Dyno test consisting of:<br>3 A (take off) cycles at rated load<br>2 B (taxi) cycles at rated load<br>1 L (double overload take off) at 1.87 x rated load | Tire successfully completed all required cycles with no issues, air retention within required limits |
| Bead Core Locking Insert w/o Inner Liner in between it and Fifth Band | Dyno test consisting of:<br>3 A (take off) cycles at rated load<br>2 B (taxi) cycles at rated load<br>1 L (double overload take off) at 1.87 x rated load | Passed, see above |
| Bead Core Locking Insert w/o splice between it and the fifth band | Dyno test consisting of:<br>3 A (take off) cycles at rated load<br>2 B (taxi) cycles at rated load<br>1 L (double overload take off) at 1.87 x rated load | Passed, see above |
| Bead Core Locking Insert w/o splice between it and the fifth band | Static test consisting of:<br>Finding Outside Diameter and Section Width sizing at rated pressure and determining the Burst pressure | Sizing:<br>SW avg = 16.00<br>OD = 44.38 at rated pressure and the<br>Burst = 897 psi<br>All values within required limits |

As can be seen in FIG. 5, the splice region between the pullout or innermost band of carcass plies and the bead core locking insert is located near the interior of the tire where the inner liner stops. As a result, the bead core locking insert may have some of the material used in the inner liner present in this splice or overlap region, including butyl or some other material properties or constituents that decrease the air permeability of the head core locking insert locally in this area in order to reduce the air leakage of the tire. Bead core locking inserts having and not having inner liner material in them or where the inner liner does extend past the splice region have been tested with positive results as shown below for passing the double overload test so both are contemplated to be within the scope of the present invention.

Furthermore, the bead core locking insert could be constructed from a single layer of bias ply tissue or square woven tissue similar to the material used in the bead wraps as well. Similarly, the angle of the reinforcements found in the bead core locking insert could be varied and not match the angle used in the carcass plies to which it is adjacent. In some cases, the bead core locking insert would not have to overlap the with a carcass ply, such as the innermost ply, but could be located near such a ply close enough where a locking effect can still be accomplished. For example, both the bead core locking Insert and the plies that were previously pulled out In the prior art could terminate in the toe of the tire with no overlap. Similarly, the bead core locking insert could be radially above the fourth or turn down band such that the turn down band is turned on top of the bead core locking insert In addition, the presence or absence of Embodiments with and without the splice and with and without the inner liner being interposed between the bead core locking insert and the fifth band were successful. Particularly surprising, no splice is necessary in order for the dimensional and pressure requirements to be met when pressuring the tire to failure. Also, while only embodiments having a fourth and fifth band of carcass plies have been tested, the inventors believe that a fifth or innermost carcass ply or band of plies that do not wrap around a bead core may not be necessary to be used with the present invention as the innermost carcass ply or baud of carcass plies may be sufficient to aid in the bead core locking function in addition to the bead core locking insert since no splice is necessary. Likewise, it may be possible for applications that are outside of aviation sector to omit the use of a fourth carcass ply or band of plies and use only the bead core locking insert.

As can be seen, embodiments of the present invention help tires to take severed loads without necessitating the use of a pullout of the innermost band of carcass plies. In addition, the bead core locking insert could be used with an innermost ply or band alone, a turn down ply or band alone, or both simultaneously. In some cases, the bead core locking insert could be used with multiple bead cores having one or more bands or individual plies wrapped around them without the use of the innermost or pullout band/ply or turn down band/ply. In aircraft tire applications, it is contemplated that there will almost always be a turn down band present while the fifth band may or may not be present depending on the tire application.

While this invention has been described with reference to particular embodiments thereof, it shall be understood that such description is by way of illustration and not by way of limitation. For example, the present invention could be used on tires that use a carcass structure having radial plies alone or some combination of radial and bias plies. Similarly, this invention can be applied to tires used in a host of applications other than aviation that require the tire to withstand extreme loads and that use multiple beads and associated wrapped carcass plies to support the load including those where only two bead cores are found in a bead portion using bead core locking insert and those applications where more than three bead cores are used. Furthermore, particular dimensions and materials have been given but it is well within the purview of one skilled in the art to make adjustments to these parameters and still practice the spirit of the present invention. Accordingly, the scope and content of the invention are to be defined only by the terms of the appended claims.

What is claimed is:

1. A tire defining circumferential, axial and radial directions that has sidewalls and bead portions having multiple bead cores and carcass plies, said tire further comprising:
    a first bead core having a carcass ply that is wrapped around said first bead core in each bead portion;
    a second bead core having a carcass ply that is wrapped around said second bead core in each bead portion;
    an innermost carcass ply that does not wrap around a bead core and that terminates in the toe portion of each bead portion; and
    bead cores locking plies wrapped around said multiple bead cores, wherein any carcass ply is a bias ply, and wherein such bead cores locking plies comprise:
    an outermost carcass ply extending from the sidewall next to the bead core that is located nearest the exterior of the tire and then axially underneath the multiple bead cores and terminating in a toe portion of each bead portion; and
    a bead core locking insert that is separate from any carcass ply, that has at least one bias ply layer with cords that are arranged at +/−40 to 72 degrees from the circumferential direction and that is located adjacent said bead cores and any carcass ply that is wrapped around said bead cores, adjacent and radially above said outermost carcass ply and underneath the multiple bead cores.

2. The tire of claim 1, wherein the bead core locking insert extends radially upward along the interior side of the outermost carcass ply.

3. The tire of claim 1, wherein the bead core locking insert extends radially upward along the innermost carcass ply, creating a splice therewith.

4. The tire of claim 3, further comprising an inner liner that is relatively air impermeable and is interposed between the bead core locking insert and the innermost carcass ply.

5. The tire of claim 1, wherein the bead locking insert extends radially upward along the interior side of the outermost carcass ply and radially upward along the interior side of the innermost carcass ply, creating a splice therewith.

6. The tire of claim 1, wherein at least one of the carcass plies have cords that are angled at +/−40 to 72 degrees from the circumferential direction.

7. The tire of claim 1, further comprising a chafer strip located between the bead core locking insert and the exterior surface of each bead portion.

8. The tire of claim 1, wherein there are three bead cores and the third bead core also has a carcass ply wrapped around said third bead core.

9. The tire of claim 1, wherein the tire is an aircraft tire.

10. The tire of claim 1, wherein the tire is symmetrically configured about its equatorial plane and wherein a ply that wraps around a bead core found in a bead portion extends radially downward along the interior side of the bead core, continues axially underneath the bead core and then returns radially upward along the exterior side of the bead core.

* * * * *